United States Patent [19]

Rector et al.

[11] Patent Number: 4,586,157
[45] Date of Patent: Apr. 29, 1986

[54] MEMORY TRANSFER UNIT

[75] Inventors: Robert E. Rector, Richardson; Larry T. Taylor; Scott H. Yarberry, both of Plano; Richard J. Grassi, Royse City, all of Tex.

[73] Assignee: Gulton Industries, Inc., Metuchen, N.J.

[21] Appl. No.: 559,834

[22] Filed: Dec. 8, 1983

Related U.S. Application Data

[63] Continuation-in-part of Ser. No. 558,120, Dec. 5, 1983.

[51] Int. Cl.[4] .................. G06F 3/023; G06F 9/24; G08B 5/00
[52] U.S. Cl. .................. 364/900; 340/815.04
[58] Field of Search ... 364/200 MS File, 900 MS File; 340/286 M, 717, 815.04, 815.05

[56] References Cited

U.S. PATENT DOCUMENTS

| 3,906,457 | 9/1975 | Mattedi et al. | 364/200 |
| 4,325,062 | 4/1982 | Devlin | 340/717 |
| 4,438,432 | 3/1984 | Hurcum | 340/717 X |
| 4,500,880 | 2/1985 | Gomersall | 340/286 M X |

Primary Examiner—Harvey E. Springborn
Attorney, Agent, or Firm—Darby & Darby

[57] ABSTRACT

A memory transfer unit is provided which permits replacing messages stored in a message display system with a different set of messages stored in the memory transfer unit. A circuit is provided for supplying power from the message display system to the memory transfer unit and for inhibiting operation of the memory transfer unit unless the power supply to it has a proper operating voltage level. Pulses produced in the message display system are counted to determine the sequential locations of data in the memory transfer unit to be transferred to the message display unit for substitution for data stored in the message display unit.

9 Claims, 5 Drawing Figures

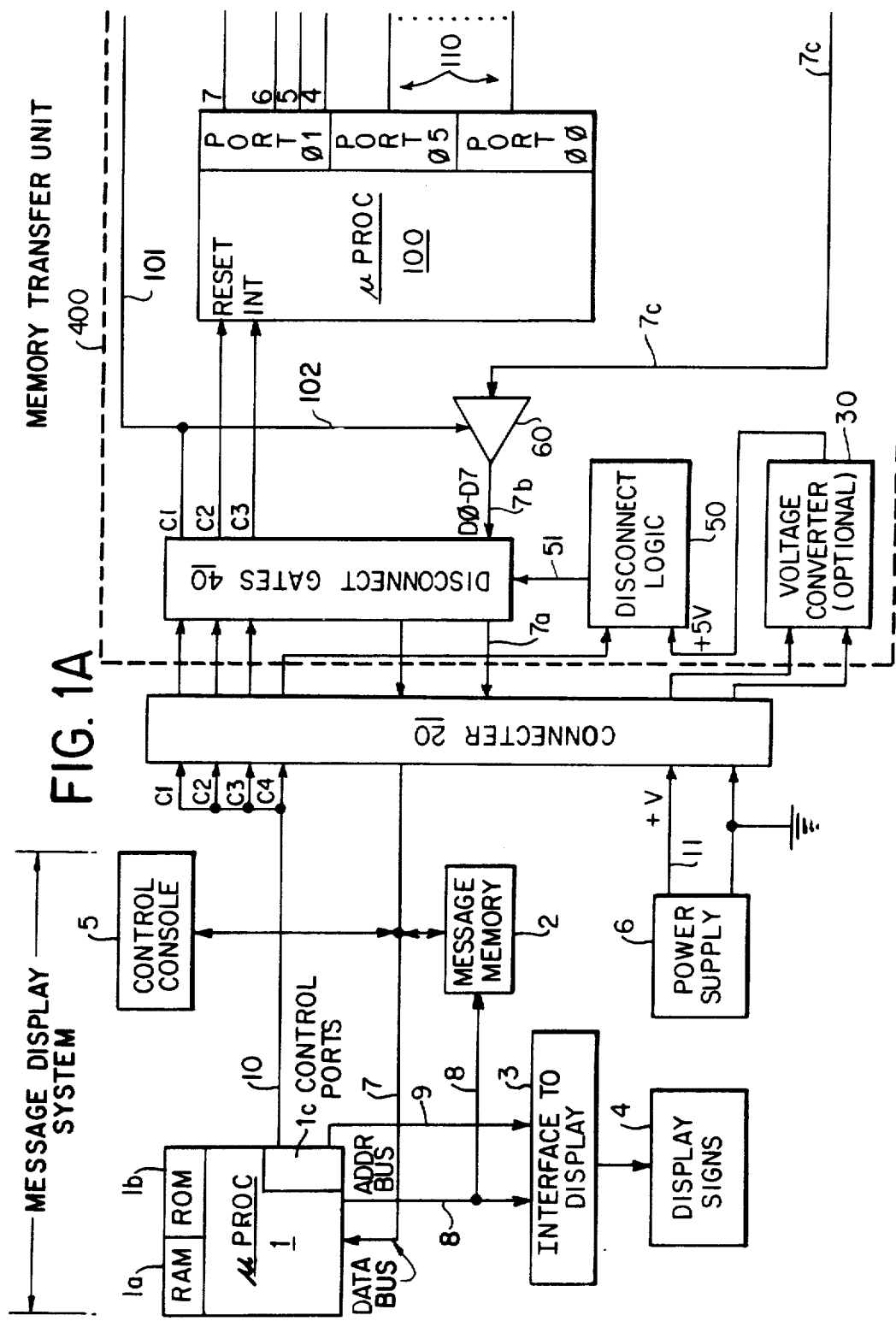

MEMORY TRANSFER UNIT

This is a continuation-in-part of application Ser. No. 558,120, filed Dec. 5, 1983.

This invention relates to display system controls and, more particularly, to a method and apparatus for changing stored message data defining displayable messages in message display systems such as the type utilizing magnetically actuated elements for displaying the destination of buses.

Display systems utilizing magnetically actuable display elements have been known for a number of years. Such systems may incorporate display elements, such as rotatable discs or spheres having one dark-colored hemisphere or surface and an opposing light-colored hemisphere or surface. Each such disc or sphere may have a permanent magnet secured to it, and be rotatably mounted in close proximity to an inductive element. A pulse of current to the inductive element creates magnetism which causes the disc or sphere to rotate to a position at which its desired light or dark surface faces the viewer. Typically, a plurality of display elements are mounted and arranged in an array. The control system for such an arrangement may cause a set of characters or symbols comprising a message to be displayed by causing a corresponding set of display elements to have their appropriate light-colored faces visible.

A number of systems for controlling the displaying of messages by the above apparatus have been devised. For example, there are systems particularly adapted for use on moving vehicles such as buses which allow a message (e.g., the origination point, the destination and intermediate stops) to be displayed which is longer than the display sign. This is accomplished by sequentially displaying portions or lines of the message one after the other.

An example of such a message display control system is illustrated in the left-hand portion of FIG. 1A. This system utilizes a microprocessor 1 to control the operation of displaying messages on the sign. The microprocessor has apparatus such as a Read Only Memory 1$b$ ("ROM"), which may be a PROM (Programmable Read-Only Memory) or EPROM (Eraseable Programmable Read-Only Memory) for storing programs for determining the functioning of the apparatus. Also included is a RAM 1$a$ (Random Access Memory) for storing data and intermediate results from manipulations of that data. The message display control system further includes a message memory 2 for storing message data representing the repertoire of messages which can be displayed by the system. Typically these messages are stored in ASCII (American Standard Code for Information Interchange) format. In addition to this message data, the message memory 2 may have sections set aside within it for storage of special characters, such as the ASCII code for a blank space.

By means of operator controls incorporated in a control console 5, the operator of the system may select a particular message to be displayed from the repertoire in the message memory 2. Under control of the microprocessor 1 and its associated stored program in the ROM 1$b$, the ASCII-coded version of the selected message is converted to appropriate signals for activating the necessary display elements for displaying the message. The microprocessor 1 communicates this information to the display elements in the display signs 4 via its address bus 8 and a set of control signal paths 9 from a control port 1$c$. Communication with the message memory 2 also is accomplished via the address bus 8 and via data bus 7.

A message display control system such as the one described above is on the market and known as Luminator Information Display System ("LIDS") made by Luminator Division of Gulton Industries Inc., Plano, Tex. In the LIDS system and in other typical message display control systems, ROM's are used to form the message 2 memory. The repertoire of messages displayable by such systems can be changed only by physically removing one or more ROM modules of the message memory 2 and replacing them with new ROM modules containing different message data. This method of replacing ROM's can be difficult to accomplish in the field. Moreover, when the replacement procedure is attempted by untrained personnel (e.g., bus mechanics with little or no electronic training), damage to the apparatus can result.

Message memories for message display systems have also been built using EPROM (Erasable Programmable Read Only Memory) modules. The data stored in such an EPROM can be changed using special equipment (e.g., equipment using ultraviolet light to change the stored data), but such equipment is not deemed to be appropriate for usage in environments such as bus garages. Moreover, it is undesirable for such equipment to be operated by personnel who are not trained electronic technicians.

In view of the above, the most common procedure of accomplishing changes of message data stored in a message display system's message memory, has been to bring the vehicle in which the system is installed to a service center which is equipped with special equipment and/or has specially trained personnel. At this center, the ROMs or EPROMs comprising the message memory of the system are either replaced with updated ones, or updating of the EPROMs is accomplished using special equipment. This procedure results in a span of time in which the bus is out of service, which is not desirable.

It is an object of the invention, therefore, to provide a method and apparatus for changing the message repertoire of a message display system which can be easily and quickly performed by relatively untrained personnel.

It is a further object of the invention that the equipment for changing the message repertoire be suitable for use at the locations at which vehicles incoporating the message display systems are normally serviced.

SUMMARY OF THE INVENTION

In recent years a new type of memory device called an "electrically erasable programmable read only memory" (EEPROM) has come into use. This type of memory is "non-volatile" in the sense that the data stored in it is not lost when power is turned off. Nevertheless, an EEPROM offers the advantage of allowing the data stored within it to be changed by electronic means. In accordance with the present invention, EEPROMs are used to form the message memory of a message display control system.

An important feature of the present invention is a portable "memory transfer unit" (MTU) which is used to transfer new message data to the EEPROMs comprising the message memory of the message display system. This memory transfer unit includes a microprocessor and a non-volatile memory for storing message data to be used for updating the message repertoires of the message display system in the field. The memory of the MTU may incorporate ROMs or EPROMs. When it desired to change the message repertoires of message display systems in the field, the ROMs or EPROMs comprising the memory of the MTU are caused to store updated message data. This can be done at a central service location which has appropriately trained personnel. The updated MTU can then be used in the field by relatively untrained personnel to update the message memory of the display system under the control of programs built into the message display system and using data transfer circuitry incorporated in the MTU.

A particular advantage of the above procedure is that it allows field message memory updating to be accomplished by physical replacement of the MTU memories only. Since one MTU can be used to update numerous message display systems, memory replacement requirements are greatly reduced as compared with previous updating procedures. Moreover, replacement of MTU memories may be safely and conveniently performed at central locations having trained servicemen.

It is also possible to form the memory of the MTU from EEPROMs. If this option is elected, the MTU memory can be updated at a service central location by re-writing data in it directly from a central computer.

Some of the advantageous features of the MTU of the present invention are its portability, simplicity, and ease of operation. The simplicity and portability of the MTU is enhanced by the fact that the MTU does not incorporate an independent power supply but, rather, draws its power from the message display system to which it is connected. This feature not only simplifies the circuitry of the MTU, but allows it to be used in locations where utility power is not readily available without requiring the use of a portable power source, such as a battery.

Other features and advantages of the invention will become more readily apparent from the following description, taken together with the appended drawings in which FIGS. 1A and 1B, taken together, are a schematic circuit diagram of a conventional message display system in combination with the memory transfer unit 400 of the present invention.

FIGS. 2A and 2B, taken together, are a more detailed schematic circuit diagram of the memory transfer unit of the invention.

FIG. 3 is a circuit diagram of a module U2 of the circuit of FIG. 2A.

DESCRIPTION OF A PREFERRED EMBODIMENT

Figure 1B:
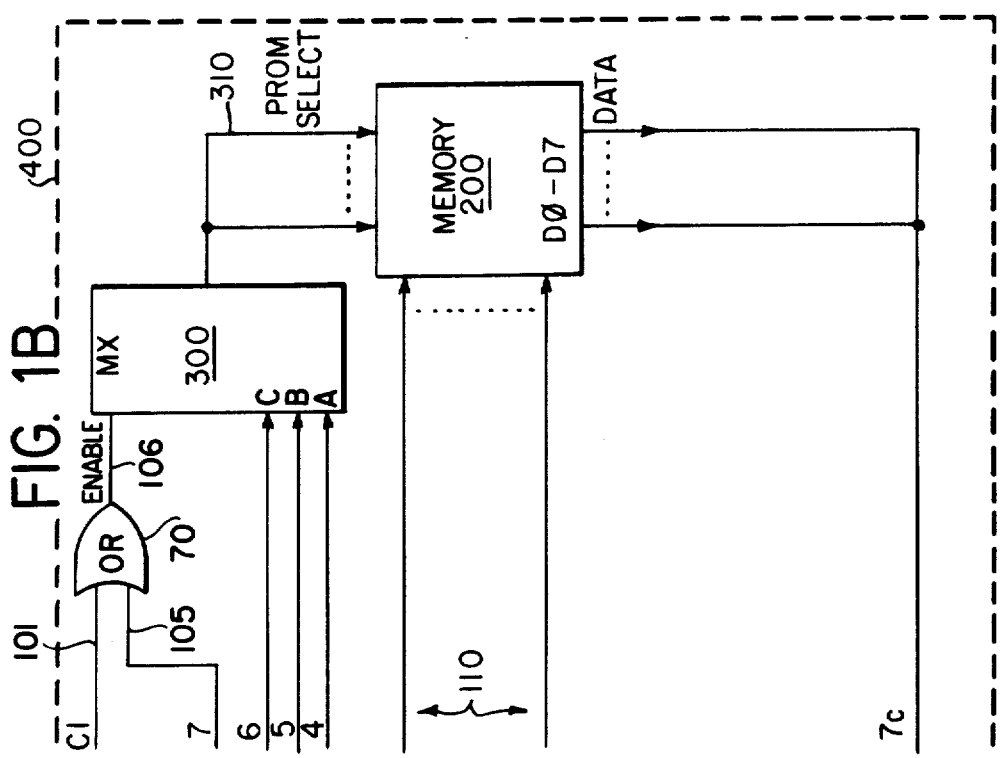

Referring to FIGS. 1A and 1B, the portion to the left of connector 20 shows a commercial message display system, such as the Gulton LIDS system mentioned above. This includes a microprocessor 1 having a read-only memory, such as a ROM 1b, for storing a program which controls the functioning of the apparatus. Also included is a random access memory (RAM) 1a, for storing data and intermediate results from the manipulations of that data. The system also includes a message memory 2 in which is stored, typically in an ASCII format, data representing the repertoire of messages it is desired to display selectively. Also included in the system are display signs 4 each containing a plurality of rotatable discs or spheres arranged in an appropriate matrix.

Communication of data and control information between the various components of this system takes place via an address bus 8, a data bus 7 and a group of control lines 9. These control lines are activated by control ports 1c of the microprocessor 1 under control of the operating program of the microprocessor 1.

The message display system also includes a control console 5 which has manual controls for selecting the message to be displayed by the display sign. The control console may also include a console display of the message currently being displayed by the signs. A further use of this console display is to display messages to the operator generated by the program of the microprocessor 1. These messages may, for example, give the operator information as to the status of the system and whether it is operating correctly.

As indicated above, microprocessor 1, under control of the program in its ROM 1b, has the capability of activating selected control signals at control ports 1c of the microprocessor 1. Some of these control signals are conveyed to the display signs 4 via a group of signal paths 9 and the display interface 3. These control signals in combination with signals sent to the display interface display 3 via the address bus 8 activate the appropriate elements of the display sign to display the message selected by the operator.

In accordance with the present invention, a group of control signal paths 10 (C1 through C4) from the control ports 1c are routed to a connector 20. Also routed to this connector 20 is the data bus 7 and a positive voltage path from a power supply 6 which provides the operating voltage to the message display control system.

A memory transfer unit 400 shown at the right in FIG. 1A and in FIG. 1B is adapted to be connected to the message display system by plugging it into the connector 20. Power (+V) for the MTU is provided by the power supply 6 of the message display system through the connector 20. It is possible that the voltage levels employed by the circuitry in the MTU may be different from those supplied by the power supply 6. For example, in one present embodiment of the invention +V=12 volts and the voltage required by the circuitry of the MTU is +5 volts. This embodiment thus requires an optional voltage converter 30, of conventional design, to convert the magnitude of the voltage +V at connector 20 to the voltage required by the particular circuitry utilized in the MTU. The MTU and the message display control system may be designed to utilize the same voltage levels. Under these conditions the voltage converter 30 is not necessary.

Because of the fact that the MTU 400 is connected to the power supply in the message display system at the same time that its signal paths are connected to the signal paths of the message display system, it is important to provide means to electrically isolate the circuitry of the MTU from the message circuitry of the display control system while the physical connection of the two units is being accomplished. This requirement exists because the voltages on the signal paths of the MTU at the time of connection are unstable and unpredictable for a period of time after connecting the MTU to power supply 6. During this time, capacitors in the MTU are charged and initial conditions of the MTU's circuits are established. This electrical isolation is accomplished by of a set of disconnect gates 40 which are controlled by a disconnect logic section 50 of the MTU. The C4 signal path from the message display control system is utilized by the disconnect logic section 50 as will be explained more fully below. The remainder of the control signal paths C1, C2 and C3 and the data bus 7 are connected to the circuitry in the MTU through the disconnect gates 40.

The MTU 400 also includes a microprocessor 100 (which illustratively may be a Mostek 38P73 8-bit microprocessor) and a conventional memory 200 and multiplexer 300. The C1 signal path output of the disconnect gates 40 is connected by lead 101 to one input leg of an OR circuit 70, and by lead 102 to the control input set of data bus gates 60. The data bus gates 60 control the flow of data over lead 76 from the memory 200 to the data bus 7 of the message display control system. The other input leg 105 of the OR circuit 70 is connected to the high order bit of output port 01 of the microprocessor 100 indicated by lead 7 of port 01 of the microprocessor. Three other signal paths from port 01 of microprocessor 100 (the next three high order bits) designated by numerals 4, 5, 6 feed inputs A, B and C of the multiplexer 300. The output of OR circuit 70 is connected by a lead 106 to an "enable" input of the multiplexer 300. When enabled, the multiplexer 300 decodes the three signals A, B and C into eight PROM select lines 310 which are utilized to select the appropriate one of the PROMS of memory 200 during memory-read operations. Ports 05 and 00 of microprocessor 100 are connected to an address bus 110 which communicates to the memory 200 the particular address to be read within the selected PROM during read operations. Signal path C2 feeds a reset input for the microprocessor 100 and signal path C3 feeds an interrupt (INT) input of microprocessor 100.

OPERATION

Using the MTU, field reprogramming of a message display control system to include new or revised messages is a simple operation. In accordance with one embodiment of the invention, the operator merely makes sure that power is applied to the system to be reprogrammed, and then pushes a button marked DEST A on the control console 5. This alerts the program of microprocessor 1 to periodically test the data bus 7 to see whether an MTU is plugged into the connector 20. When there is no MTU plugged in, the data appearing on the data bus 7 at the time of testing will, typically, have a value other than hexadecimal '10' since the data bus lines at the connector 20 will be floating. When a MTU is plugged in, however, the data bus 7 will carry a pre-set value (such as hexadecimal '10') which is the predetermined data stored in location 0 of PROM 0 of memory 200. Other locations of memory 200 can be addressed by generating pulses in the control signal path C3 feeding the INT (interrupt) pin of microprocessor 100. Microprocessor 100 counts these pulses and converts this count into a corresponding memory address for memory 200. These decoded addresses are used to activate address bus 110 and control port 01 to select the appropriate PROM in memory 200, and the location within that PROM to be read. As these pulses occur sequentially, successive memory 200 addresses are accessed to have their data transferred to memory 2 to replace the original data stored in memory 2. Prior to initiating the process of updating the message memory 2 using data from memory 200, a number of storage locations in the memory 200 which have predefined data stored in them are tested to see whether this predefined data is, in fact, read out correctly. If this test is successful, the program in microprocessor 1 activates the control console 5 to display a message to the operator to "PUSH CLEAR". If the operator wishes to proceed with the update of the message display control system he presses a CLEAR button on the console and updating will begin. While this operation is proceeding, the messages "BUSY" and "TEST" are displayed on the console 5 at appropriate times. When the transfer process is complete the console 5 will display "FINISHED O.K. DISCONNECT". The operator then disconnects the MTU 400 from connector 20.

During the process of updating the data in message memory 2, the program in microprocessor 100 to update its internal count so as to next read data from a location of memory 200 by causing pulses to be generated on signal path C3. Microprocessor 1 then activates control signal path C1 to gate the data from the selected memory location through data gates 60 and onto data bus 7 of the message display control system via the connector 20. Under control of the microprocessor 1 program, the data appearing on data bus 7 is written into the appropriate EEPROM location in message memory 2. Preferably, a number of tests should be performed upon updating message memory 2 to ensure that the data placed in message memory 2 is the correct data from memory 200.

At the conclusion of the above data transfer operation microprocessor 1 causes signal path C4 to be activated thereby activating the disconnect logic section 50 to disconnect the C1, C2, and C3 signal paths and the data bus 7 from the MTU. The message "FINISHED O.K. DISCONNECT" is then displayed on the control console 5 and the operator may disconnect the MTU from the system. A listing of the presently preferred source code of the program of microprocessor 1 is annexed hereto as Appendix A (which has not been printed).

DETAILED DESCRIPTION

Figure 2A:
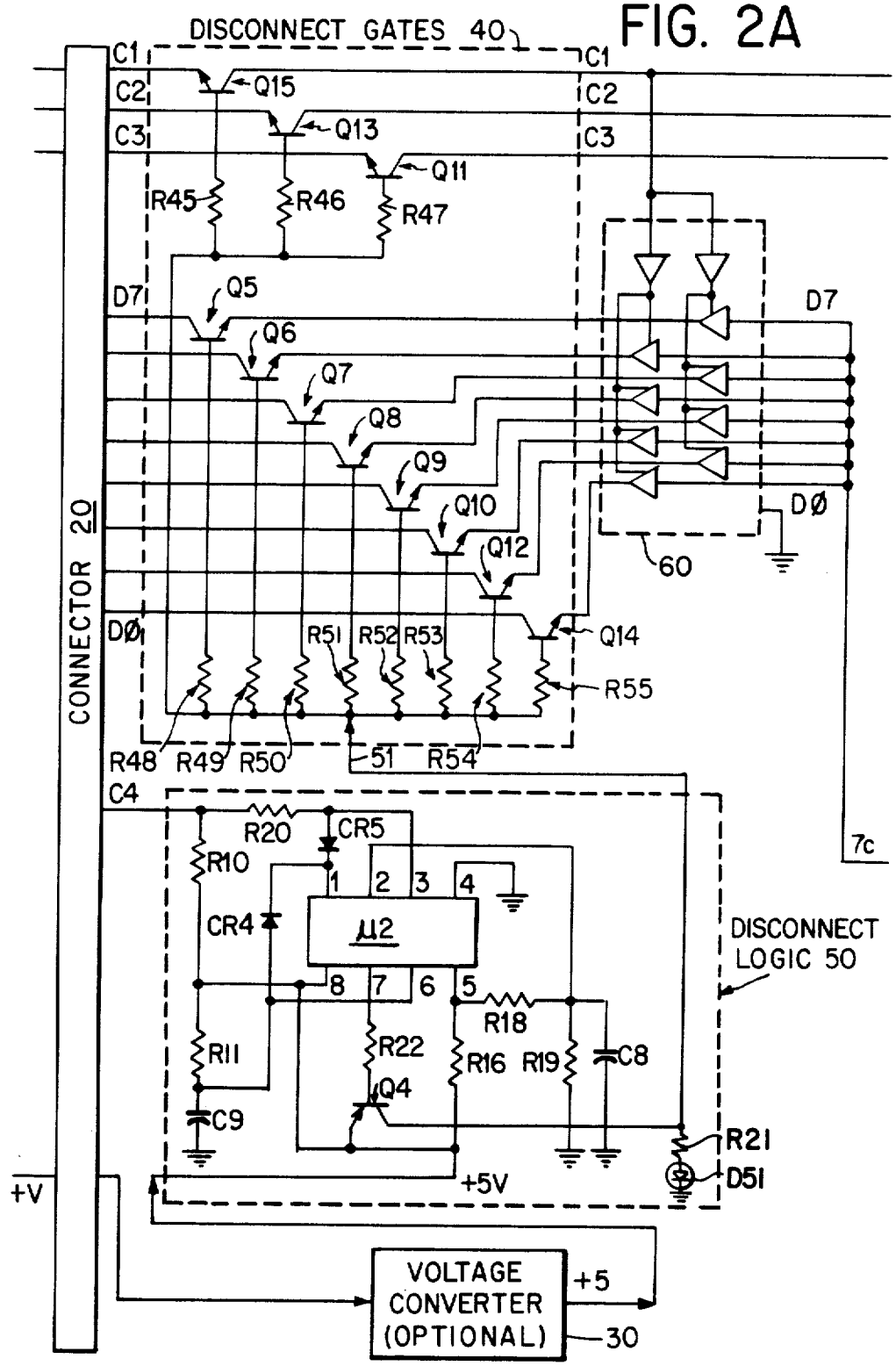
Figure 2B:
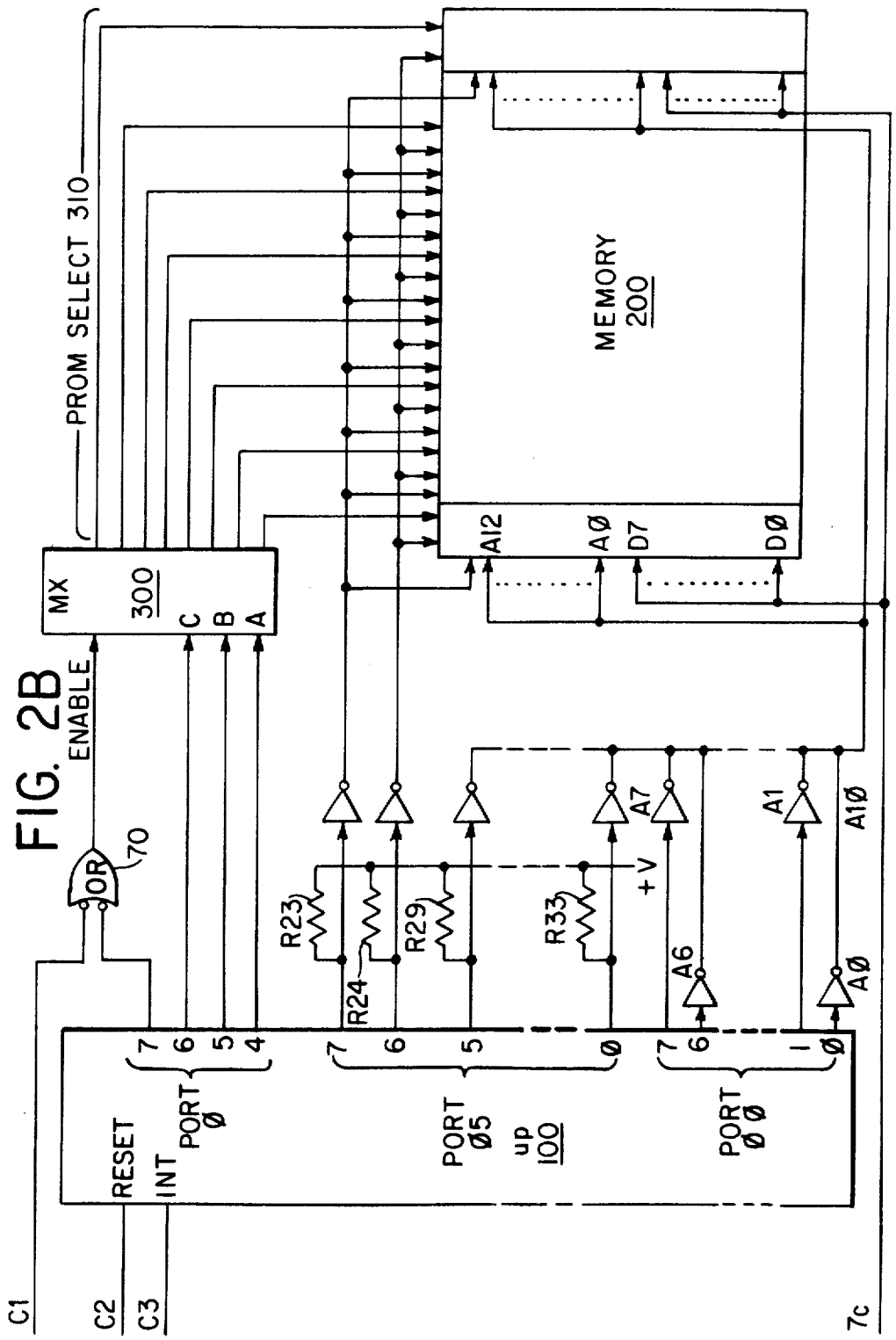

A more detailed diagram of the circuit elements comprising the MTU 400 is shown in FIGS. 2A and 2B. As shown in FIGS. 2A and 2B, the disconnect gates 40 comprise a plurality of transistors Q5 through Q15. The base of each of these transistors is tied to a gating signal path 51 through respective resistors R48 through R53. The emitter of Q15 is connected to the control signal path C1 at the connector 20. The collector of Q15 is tied to the gating inputs of the data bus gate 60, which, in a preferred embodiment, is an eight-gate integrated circuit (e.g. a 74LS244). The data output pins of data gates 60 are tied to the emitters of transistors Q5 through Q10, Q12, and Q14, and the collectors of these transistors are respectively connected to the D7 through D0 output pins of the data bus 7 at the connector 20. The D0 through D7 input pins of the data gate 60 are connected to a segment 7C of the data bus of the MTU which is fed by respective pins D0 through D7 of the memory 200.

The C1 signal at the collector of transistor Q15 is also fed to one input leg of an OR circuit 70 the output of which the ENABLE input of the multiplexer 300. The other input leg of the OR circuit 70 is connected to port 01 of the microprocessor 100.

The control signal path C2 at connector 20 is connected to the emitter of transistor Q13. The collector of transistor Q13 is connected to the "RESET" input of the microprocessor 100. Also connected to the reset input of microprocessor 100 is a capacitor C13 the other side of which is connected to ground, a resistor R31, and the anode of a diode CR7. The cathode of diode CR7 and the other side of resistor 31 are connected to +5 volts. The network comprising capacitors C13, CR7 and Resistor R31 ensures that only a true reset signal will cause a reset of the microprocessor 100, and prevent microprocessor 100 from being reset by relatively short pulses of noise. During normal operation, capacitor C13 is charged to a +5 volt level. It is necessary for the RESET input 100 of microprocessor to go to ground in order for a reset to be accomplished. Discharge of capacitor C13 must take place through resistor R10, and the RC time constant of this combination is, preferably, selected to be approximately one millisecond. Thus, only relatively long pulses will be capable of causing the microprocessor 100 to be reset since the retained charge on capacitor C13 will prevent pulses shorter than approximately one millisecond from bringing the RESET input of microprocessor 100 to a ground level.

Control signal path C3 at the connector 20 is connected to the emitter of transistor Q11. The collector of transistor Q11 is connected to the interrupt (INT) input of microprocessor 100.

Output ports 05 and 00 of the microprocessor 100 are utilized to drive an address bus 110 which addresses particular memory locations within the respective PROMs of the memory 200. In one present embodiment of this apparatus, eight PROMs are utilized to form the memory 200. Bits 4, 5 and 6 of port 01 of microprocessor 100 feed inputs A, B and C of the miltiplexer 300. These three signal paths contain encoded information as to which one of the eight PROMs comprising memory 200 is to be selected in a particular read operation. Upon enablement of multiplexer 300 by activation of signal path 71, multiplexer 300 decodes the signals on its inputs C, B and A to activate one of its eight output pins which feed respective PROM select lines 310 thus selecting the corresponding PROM module of memory 200 for reading.

One particularly advantageous feature of the present invention is its means for automatically disconnecting the circuitry of the MTU from the internal circuitry of the message display control system when power is unstable in the MTU (that is, while power is coming up or in the process of being shut down). This disconnecting means includes the disconnect logic section 50 which controls the base circuits of transistors Q5 through Q15 so as to turn off these transistors when power is not stable.

Figure 3:
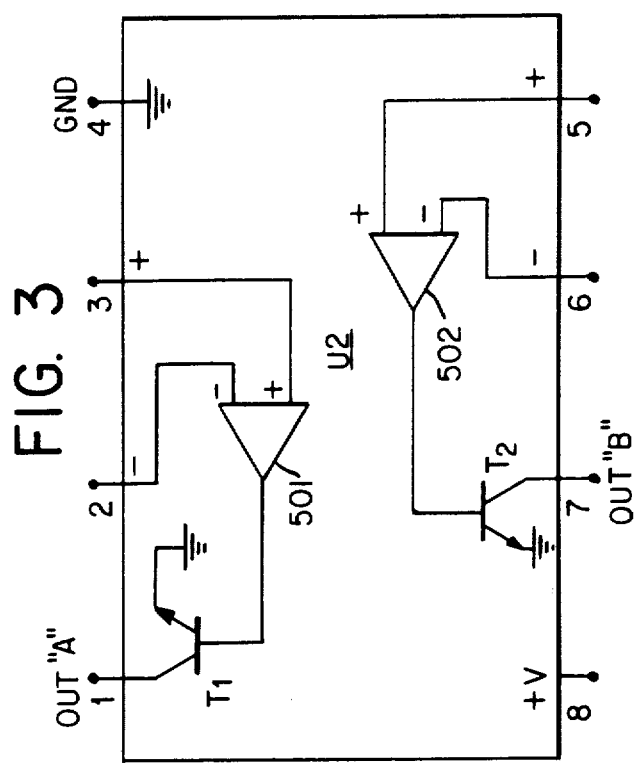

In a presently preferred embodiment, the disconnect logic section 5 includes an integrated circuit U2, containing a pair of voltage comparator circuits 501 and 502 (see FIG. 3). The (−) inputs of comparators 501 and 502 are connected respectively to pins 2 and 6 of integrated circuit U2. The (+) inputs of comparators 501 and 502 are connected respectively to pins 3 and 5 of U2. The output of comparator 501 is connected to the base of a transistor T1. The emitter of this transistor is connected to ground and the output of the transistor is connected to pin 1 (OUT A) of integrated circuit U2. The output of comparator 502 is connected to the base of a transistor T2 the emitter of which is connected to ground. The collector of transistor T2 is connected to pin 7 of U2 (OUT B).

Pin 1 of module U2 is connected to the respective cathodes of a diode CR5 and a diode CR 4. The anode of diode CR5 is connected to pin 3 of U2 and is also connected to one side of a resistor R20. The other side of the resistor R20 is connected to a resistor R10 and to the control signal path C4 from the message display system at the connector 20. The other side of resistor R10 is connected to pin 8 of module U2 and to a resistor R11. The other side of resistor R11 is connected through a capacitor C9 to ground and is also connected to pin 6 of module U2 and to the anode of the diode CR4.

Pin 2 of module U2 is connected to ground through a parallel circuit combination, one leg of which comprises a capacitor C8, and the other leg of which is a resistor R19. Pin 2 is also connected to a resistor R18. The other side of resistor R18 is connected to pin 5 of module U2 and to a resistor R16. The other side of resistor R16 is connected to the +5 volt supply. Pin 4 of U2 is the ground pin of the integrated circuit module and is connected to the MTU ground.

Pin 7 of module U2 is connected to the base of a transistor Q4 through a resistor R22. The emitter of transistor Q4 is connected to the +5 volt supply. The collector of transistor Q4 is connected to the signal path 51 which controls the disconnect gates 40. The collector of transistor Q4 is also connected to ground through a resistor R21 and a light emitting diode (LED) DS1.

OPERATION OF DISCONNECT CONTROL LOGIC

A. CONNECTION

Before power is applied to the circuits of the MTU, current cannot flow in the base circuits of transistors Q5 through Q15 and the signal paths controlled by these transistors effectively become open circuits. The transistors Q5 through Q15 act as switches which effectively isolate the internal circuitry of the message display system from the internal circuitry of the MTU when MTU power is off or not yet fully on.

When the MTU is plugged into the connector 20, operating power is supplied to the MTU from the +V pin of connector 20. In the present embodiment, this +V is converted to the MTV's operating voltage of +5 v by a voltage converter 30 of conventional design. This operating voltage (+5 v) is supplied to pin 8 of module U2. When the operating voltage appears at pin 8, capacitor C9 begins to charge through R11 (the time constant of this RC combination is selected to be approximately 2 seconds).

At the same time, capacitor C8 begins to charge through resistors R16 and R18. The values of R16, R18 and R19 are selected so that C8 will charge to a value of approximately +0.8 volts.

Voltage comparator 501 has the characteristic that if the absolute value of the voltage at its (−) terminal is greater than the absolute value of the voltage at its (+) terminal a signal will be produced at its output terminal. This signal is fed to the base of transistor T1 and causes T1 to conduct current through its collector circuit to ground. When T1 conducts, pin 1 (OUT A) of module U2 goes to ground (0 volts).

Similarly, voltage comparator 502 has the characteristic that when the absolute value of the voltage at its (−) terminal is greater than the absolute value of the voltage at its (+) terminal, a signal is produced at its output terminal which causes transistor T2 to conduct thereby causing pin 7 of module U2 (OUT B) to go to ground.

The values of resistors R16, R18 and R19 are selected to comprise a voltage divider which provides a voltage of approximately 4.2 volts to pin 5 of module U2 when the power supplied to the MTU reaches its nominal or operating voltage level of +5 volts. Thus, when the voltage at pin 6 of module U2 reaches and exceeds the +4.2 volt level as a result of the charging of capacitor C9, voltage comparator 502 is conditioned to turn transistor T2 on thus providing a 0 volt output at pin 7 of module U2. This provides a current sink to the base of transistor Q4 thereby turning Q4 on (i.e., allowing it to conduct). When Q4 conducts, a voltage of approximately +4.8 volts (the +5 volt supply voltage less the collector to emitter voltage drop across the CE junction of transistor Q4) is provided to signal path 51. This positive voltage acts as a base drive for transistors Q5 through Q15 thereby providing connection between the data bus of the MTU and the data bus of the message display system and connection of control signals C1, C2 and C3 between the respective units.

B. DISCONNECTION

When the program in microprocessor 1 of the message display system determines that the updating of its message memory has been completed, it activates the control signal path C4 signal at its control ports 1C. The activation of this signal path provides a ground level to the point of connection between resistors R10 and R20. This ground level also appears at pin 3 of module U2 and thus at the (+) input of voltage comparator 501. As noted previously, the (−) input of voltage comparator 501 is held at +0.8 volts through the voltage dividing effect of resistors R16, R18 and R19. Thus, when the positive input of comparator 501 drops below +0.8 volts, a signal is produced at the output of comparator 501 which causes transistor T1 to conduct. When T1 conducts, pin 1 of module U2 (OUT A) goes to a ground (0 volt) level. The grounding of pin 1, in turn, pulls pin 6 of module U2 to less than 0.8 volts through diode CR4 (the difference in voltage between pin 1 and pin 6 is attributable to the voltage drop across diode CR4). The grounding of pin 1 of module U2 also pulls pin 3 of module U2 to a voltage somewhat less than +0.8 volts through diode CR5. This results in a stable condition in which pin 2 is at a +0.8 volt level and pin 3 is at a level somewhat below +0.8 volts and the 0 volt output at pin 1 of module U2 is thus "latched up".

When the above conditions occur, the voltage at the (+) input of voltage comparator 502 (4.2 volts) is greater than the voltage at the minus output of comparator 502 (approximately +0.8 volts) which causes the enabling signal at the output of comparator 502 to be turned off thereby deconditioning T2 from conducting. The turning off of transistor T2 removes the base current sink from transistor Q4, Q4 stops conducting, and the gating signal is removed from signal path 51 thereby causing transistors Q5 through Q15 to disconnect the circuitry of the MTU from the circuitry of the message display system. It is now safe for the MTU to be physically disconnected from connector 20.

DATA TRANSFER OPERATIONS

As indicated previously, the transfer of new message data contained in the memory 200 of the memory transfer unit to the message memory 2 of the message display system takes place under control of the program resident in the ROM 1b of microprocessor 1 of the message display system. A full listing of a presently preferred embodiment of this program is annexed hereto as Appendix A (which has not been printed). A general description of its operation follows.

Periodically, whenever power is applied to the memory control system, microprocessor 1, under control of the program, samples data bus 7 to see whether any data has been placed on the data bus via connector 20. Because of the circuit characteristics of the message display system, when nothing is plugged into connector 20 and its data bus pins D0–D7 are floating, a data byte of all one's (hex FF) will be seen by microprocessor 1 during this interrogation. When the MTU 400 is plugged into connector 20 and it reaches a stable power level, it automatically places on data bus 7 the data stored in location 0 of PROM 0 of memory 200. This location always has a value of hex '10' stored in it. The detection of a data byte of hex '10' alerts the program in the microprocessor 1 to perform a number of diagnostic routines to determine whether data transfer operations between the MTU and the message display control system can take place successfully. Among these routines are routines in which specific locations of memory 200 at which predetermined data is always stored are interrogated to determine if this data can be read correctly. This is done by comparing the data read from the memory 200 with similar stored data within the program of microprocessor 1. If the diagnostic routines are performed successfully, microprocessor 1 causes a message of "PUSH CLEAR" to be displayed at the control console 5. At this time, the operator of the system may decide either to continue or to abort the updating operation. If he elects to continue he pushes the CLEAR button and the microprocessor 1 proceeds to its data transfer routines.

This data transfer is accomplished in a novel manner which allows microprocessor 1 to indirectly maintain control of the locations from which data is read from memory 200, while at the same time it keeps address bus 8 free for controlling the writing of the data read from memory 200 into corresponding locations in message memory 2.

As a first step in this procedure, microprocessor 1 activates the C2 signal path at its control port 1C. As set forth above, this signal is routed to the RESET input of microprocessor 100. Resetting of microprocessor 100 initializes a number of internal counters and registers. As a result of this initialization, the outputs of all pins of output ports 01, 05 and 00 go to a logical '0', thus selecting location 0 of PROM 0 of memory 200 for reading.

Microprocessor 1 now activates the C1 signal path at output port 1C which enables a PROM selection line 310 to be activated via OR circuit 70 and multiplexer 300. The data stored in the selected memory location now appears on data bus portion 7C of the MTU. It will be noted also that the C1 signal path also provides a gating signal at data gates 60. Thus, the data on data bus portion 7C is routed through data gates 60 to the data bus 7 of the message display control system where it is available for microprocessor 1 and message memory 2. Microprocessor 1 transfers this data into the corresponding location (here location 0 of EEPROM 0 of the message memory) by placing an address on address bus 8 of the memory location in message memory 2 in which the data is to be stored. After this first byte of data has been transferred from memory 200 to message memory 2, microprocessor 1 activates the C2 signal which drives the INT pin of microprocessor 100. Rather than treat this interrupt signal as a conventional interrupt, however, microprocessor 100 merely counts the number of pulses which it has seen at its INT input in internal registers and uses this count as an address for accessing data in memory 100. Thus, the count in the internal register driven by the C2 signal is decoded to put a particular address on address bus 110 and to select a particular PROM to be read.

The above procedure continues with microprocessor 1 controlling both the location from which data is read in memory 200, and the location into which the data is written in message memory 2 until the data in message memory 2 has been fully updated. During this process a number of checks and comparisons are also performed to ensure that the data has been transferred correctly.

When the process of transferring data from memory 200 to message memory 2 has been completed the program in microprocessor 1 activates the C4 signal which, in the manner previously described, causes the circuitry of the MTU to be electrically disconnected from the circuitry of the message display system by means of the disconnect gates 40. When this has been accomplished microprocessor 1 causes a message to be displayed to the operator on control console 5 which instructs him that he may now physically disconnect the memory transfer unit from the message processing system.

Values for the circuit elements utilized in a presently preferred embodiment of the invention are listed below in Table I. Table I also identifies the integrated circuits used in the preferred embodiment. Although a specific embodiment of the invention has been described for illustrative purposes, it will be appreciated by one skilled in the art that many modifications, additions and substitutions are possible without departing from the scope and spirit of the invention.

TABLE I

| | |
|---|---|
| Q4 | National Semiconductor PN 2907A |
| Q5–Q15 | Fairchild PN 2222A |
| R45–R53 | 2K ohms |
| R20, R10, R16, R19, R31, R33, R23, R24, R28–R30, R32, R34, R35 | 10K ohms |
| R11 | 200K ohms |
| R18 | 43K ohms |
| R22 | 11K ohms |
| C9, C8 | 10 F |
| C13 | .1 F |
| CR4, CR5 | Fairchild FDH 400 |
| U2 | LM2903P |
| Data Gates 60 | Texas Instrument 74LS244 |
| Microprocessor 100 | Mostek 38P73 |

What is claimed is:

1. A method for changing a repertoire of messages stored in message memory means for storing messages displayable by a circuitry-containing message display system wherein said message memory means comprises a programmable memory which is alterable by electronic means, said method including the sequential steps of:
   providing a portable circuitry-containing memory transfer unit including a memory containing a new repertoire of messages which is desired to be displayable by said message display system;
   connecting said memory transfer unit to said message display system; and
   changing the data stored in said message memory to correspond to the data stored in said memory transfer unit memory.

2. The method of claim 1 further including the steps of:
   providing power to said portable message transfer unit from said message display system; and
   automatically electrically isolating the circuitry of the memory transfer unit from the circuitry of the message display system until the voltage supplied to the circuitry of the memory transfer unit reaches an operating value.

3. The method of claim 2 further including the steps of:
   determining when said changing step is completed;
   signaling the memory transfer unit to electrically isolate its circuitry from the circuitry of the message display system; and
   automatically giving a signal to disconnect the memory transfer unit from the message display system.

4. The method of claim 1 wherein the message display system includes a first microprocessor having an output control port and also includes an address bus for selecting locations of said message memory to be accessed, said port and bus having signal paths, and wherein the memory transfer unit includes a second microprocessor having an interrupt input and a plurality of output ports, and also includes an address bus for selecting locations to be accessed in said memory transfer unit memory, said second microprocessor ports and memory transfer address bus having signal paths, and wherein said changing step includes the steps of:
   activating a signal path of said first microprocessor control port and said second microprocessor interrupt input with pulses for selecting a location of said memory transfer unit memory to be accessed;
   counting said pulses;
   decoding the count to activate corresponding signal paths of said memory transfer unit address bus and second microprocessor control ports to select a location of said memory transfer unit memory for reading data therefrom;
   transferring said data to the message display system; and
   activating said message display system address bus to select corresponding locations of said message memory means for storing said data.

5. For use in updating the repertoire of messages displayable by a message display system which includes a first microprocessor having a control port, a message memory comprising an electrically erasable programmable read-only memory for storing said messages in encoded form, a data bus for communicating data between said message memory and said microprocessor, and an address bus for communicating address data from said microprocessor to said message memory for selecting locations of said message memory for reading data from or writing data to said message memory; a portable memory transfer unit comprising:
   a second microprocessor;
   a second memory adapted to store message data for utilization in updating said message memory;
   means for connecting said first microprocessor control port to said second memory and to said second microprocessor; and
   means for connecting said message display system data bus to said second memory.

6. A memory transfer unit in accordance with claim 5 further comprising means for providing power to said memory transfer unit from a power supply in said message display system at a predetermined voltage; and
   means responsive to an absence of said voltage for disconnecting said message display system data bus from said second memory and disconnecting said first microprocessor control port from said second memory and from said second microprocessor.

7. A memory transfer unit in accordance with claim 6 wherein said disconnecting means includes means responsive to a signal from said first microprocessor control port for disconnecting said message display system data bus from said control port.

8. A memory transfer unit in accordance with claim 5 wherein said second microprocessor includes
   means responsive to a signal at said control port connecting means for selecting a location in said second memory for recording,
   said memory transfer unit further comprising means responsive to a second signal at said control port connecting means for activating said data bus connecting means with signals corresponding to the data stored in the selected location of said second memory.

9. An updatable message display system comprising:
   a message display controller including
      a first microprocessor having a control port;
      a message memory comprising an electrically eraseable programmable read-only memory for storing in encoded form messages displayable by said system;
      said control port having signal paths;
      a data bus adapted to transmit message data between said message memory and said microprocessor;
      an address bus adapted to transmit address data from said microprocessor to said message memory for accessing selected locations in said message memory; and
   a portable memory transfer unit including
      a second microprocessor having an interrupt input;
      a non-volatile memory adapted to store new message data for use in updating said message memory;
      means for connecting said data bus to said non-volatile memory;
      means for connecting a single signal path of said control port to the interrupt input of said second microprocessor;
   said first microprocessor also including program means for activating said single signal path to indicate a location in said non-volatile memory to be read; and
   means for activating said address bus to select a location in said message memory corresponding to said non-volatile memory location for writing said new message data in said message memory location.

* * * * *

UNITED STATES PATENT AND TRADEMARK OFFICE
CERTIFICATE OF CORRECTION

PATENT NO. : 4,586,157

DATED : April 29, 1986

INVENTOR(S) : Robert E. Rector

It is certified that error appears in the above-identified patent and that said Letters Patent is hereby corrected as shown below:

Column 12, line 47, delete "read-only".

Signed and Sealed this

Twenty-sixth Day of August 1986

[SEAL]

Attest:

DONALD J. QUIGG

Attesting Officer

Commissioner of Patents and Trademarks